United States Patent [19]

Yagi et al.

[11] 4,020,808

[45] May 3, 1977

[54] EXHAUST GAS RECIRCULATION FOR EMISSIONS CONTROL

[75] Inventors: Shizuo Yagi; Kiyoshi Miyaki, both of Asaka, Japan

[73] Assignee: Honda Giken Kogyo Kabushiki Kaisha, Tokyo, Japan

[22] Filed: Feb. 21, 1974

[21] Appl. No.: 444,415

[30] Foreign Application Priority Data

Feb. 23, 1973 Japan .............................. 48-21338

[52] U.S. Cl. .......................................... 123/119 A
[51] Int. Cl.² ........................................ F02B 25/06
[58] Field of Search .......... 123/119 A, 32 ST, 75 B

[56] References Cited
UNITED STATES PATENTS

| | | |
|---|---|---|
| 3,294,073 | 12/1966 | Bressan .................. 123/119 A |
| 3,408,992 | 11/1968 | Von Seggern et al. ........ 123/32 ST |
| 3,612,020 | 10/1971 | Moulds .................... 123/119 A |
| 3,633,553 | 1/1972 | Holzupfel ................. 123/119 A |
| 3,799,130 | 3/1974 | Dahlstrom ................. 123/119 A |
| 3,809,039 | 5/1974 | Alquist ................... 123/119 A |
| 3,941,105 | 3/1976 | Yagi et al. ............... 123/119 A |

*Primary Examiner*—C. J. Husar
*Assistant Examiner*—David D. Reynolds
*Attorney, Agent, or Firm*—Lyon & Lyon

[57] ABSTRACT

Exhaust gas from an internal combustion piston engine is recirculated through a rich mixture auxiliary intake passage leading to an auxiliary combustion chamber. A valve controls the relative proportions of exhaust gas and air supplied to the auxiliary intake passage, and the valve is controlled by means responsive to suction pressure downstream from the auxiliary throttle valve, and is also responsive to movement of that throttle valve.

2 Claims, 1 Drawing Figure

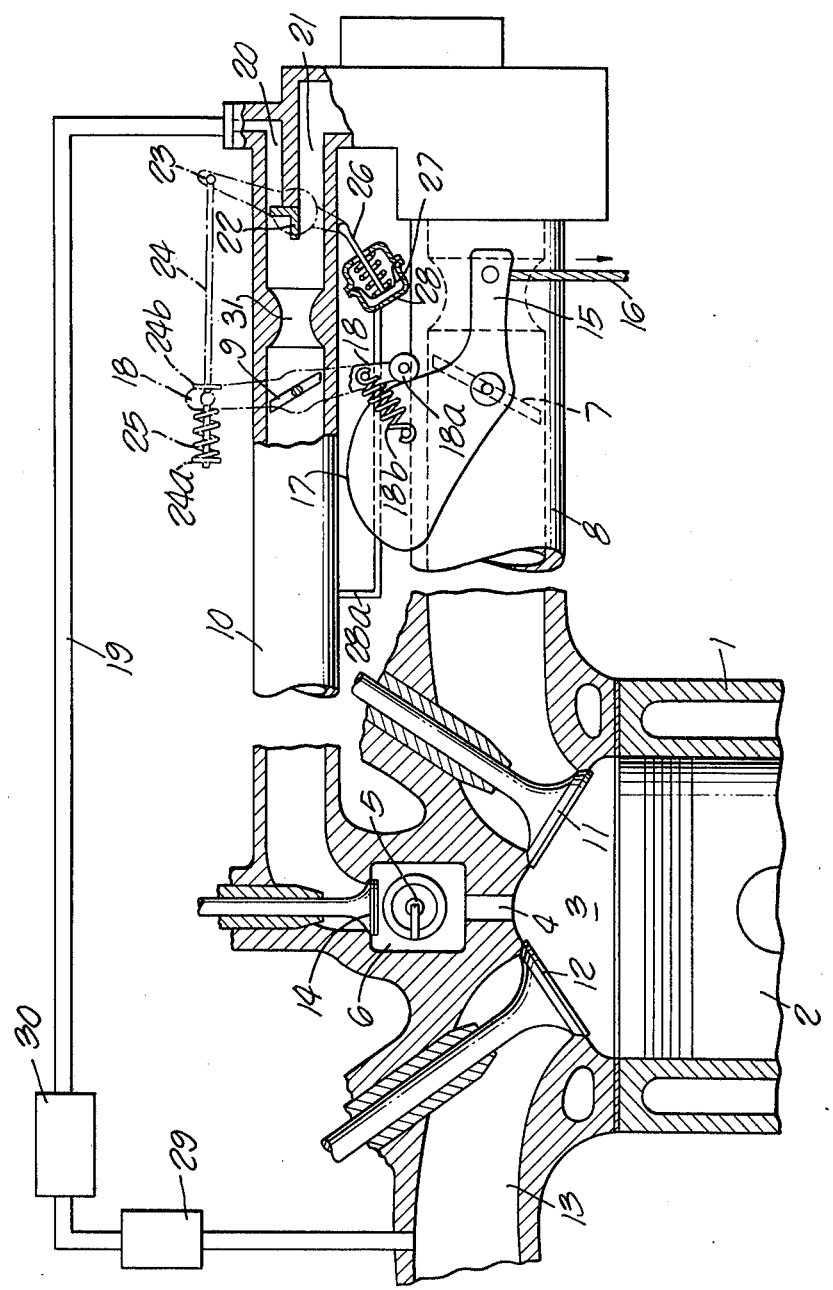

EXHAUST GAS RECIRCULATION FOR EMISSIONS CONTROL

This invention relates to internal combustion piston engines of the type having a main combustion chamber and an auxiliary combustion chamber connected by a torch nozzle. The rich mixture supplied to the auxiliary chamber is spark ignited to cause a flame jet to project through the torch nozzle to ignite the lean mixture in the main combustion chamber. It is known that unwanted pollutants such as oxides of nitrogen (NOx) in the exhaust gases delivered to atmosphere may be reduced by reducing the maximum peak temperature in the combustion chambers of the engine.

In accordance with this invention, exhaust gas is introduced into the auxiliary combustion chamber in varying proportions with rich-mixture, depending upon the load on the engine. Greater proportions of exhaust gas are used for higher engine loads. The presence of the exhaust gas in the auxiliary combustion chamber has the effect of reducing the peak combustion temperature, and this in turn reduces NOx emissions in the exhaust gas.

Also, in accordance with this invention, means are provided to introduce a slight delay in the increase in proportion of exhaust gases delivered to the auxiliary intake passage during rapid acceleration, in order to avoid unwanted misfiring.

Other and more detail objects and advantages will appear hereinafter.

The drawing comprises a sectional side elevation showing a preferred embodiment of this invention.

Referring to the drawing, an internal combustion engine 1 has a reciprocating piston 2 which forms one wall of a main combustion chamber 3. A torch nozzle 4 connects the main chamber 3 to the auxiliary combustion chamber 6. A spark plug 5 is provided to ignite the mixture in the auxiliary chamber 6 to cause a jet flame to project through the torch nozzle 4 to ignite the mixture in the main combustion chamber 3.

A main throttle valve 7 is provided in the main intake passage 8, and an auxiliary throttle valve 9 is provided in the auxiliary intake passage 10. The main intake passage 8 communicates with the main combustion chamber 3 through the main intake valve 11. Similarly, the auxiliary intake passage 10 communicates with the auxiliary combustion chamber 6 through the auxiliary intake valve 14. The exhaust valve 12 controls flow of exhaust gases from the main chamber 3 through the exhaust passage 13.

The main throttle valve 7 is fixed to the cam member 15, to which the throttle cable 16 is attached. The cam surface 17 is contacted by a roller 18a carried on one end of the arm 18. A tension spring 18b acts to hold the roller 18a in contact with the cam surface 17. The arm 18 is fixed to the auxiliary throttle valve 9.

An exhaust gas conduit 19 is connected at its upstream end to the engine exhaust passage 13 and it serves to deliver exhaust gas to the control valve 22 fixed to arm 23. This control valve 22 is positioned upstream from the auxiliary throttle valve 9 in the auxiliary intake passage 10. Exhaust gas is supplied from the conduit 19 to the control valve 22 by way of the exhaust gas inlet 20. Air is delivered to the control valve 22 through inlet 21. Fuel for the rich mixture is inducted by means (not shown) at the carburetor venturi 31.

Means including a lost motion connection are provided for connecting the arms 18 and 23. Thus, the rod 24 is pivoted at one end to the arm 23 and slides through an opening in the arm 18. An abutment 24a is fixed to the other end of the arm 18. A coil compression spring 25 is interposed between the abutment 24a and the arm 18. Another abutment 24b is fixed to the rod 24 and is held in contact with the arm 18 by the action of the spring 25. From this description it will be understood that counterclockwise movement of the auxiliary throttle valve 9 from the position shown in the drawing results in tensioning of the rod 24 to move the control valve 22 in a direction to cause a relative increase in the amount of exhaust gas from the inlet 20 and a relative decrease in the amount of air from the inlet 21.

Means are provided for causing a delay action in the movement of the control valve 22 during rapid acceleration, in order to avoid misfiring of the engine. When the throttle cable 16 is abruptly tensioned to cause quick opening movement of the main throttle valve 7, the auxiliary throttle valve 9 also moves quickly toward open position, but the rod 26 pivotally attached to the lever 23 presents it from moving rapidly, and therefore the arm 18 moves to compress the spring 25. The rod 26 is connected to the diaphragm 27, and the vacuum chamber 28 under the diaphragm 27 is connected by means of the conduit 28a to the auxiliary intake passage 10 downstream from the auxiliary throttle valve 9.

The exhaust conduit 19 may be provided with a separator 29 and a filter 30, if desired.

Having fully described our invention, it is to be understood that we are not to be limited to the details herein set forth, but that out invention is of the full scope of the appended claims.

We claim:

1. In an internal combustion piston engine, the combination of: walls including a piston forming a main combustion chamber, walls forming an auxiliary combustion chamber, a torch nozzle connecting said chambers, ignition means associated with said auxiliary chamber, a main intake passage for conducting a lean mixture to the main chamber, an auxiliary intake passage for conducting a rich mixture to the auxiliary chamber, said auxiliary intake passage including a carburetor venturi for inducting fuel into said auxiliary intake passage, means forming a valved exhaust passage leading from the main chamber, and passage means connected to said exhaust passage and to said auxiliary intake passage at a location spaced from said carburetor venturi for delivering a portion of the exhaust gases to the auxiliary intake passage.

2. In an internal combustion piston engine having a main intake passage for conducting lean mixture to a main combustion chamber and having an auxiliary intake passage for conducting a rich mixture to an auxiliary combustion chamber, the combustion chambers being connected by a torch nozzle, and an exhaust passage leading from the main combustion chamber, the improvement comprising, in combination: a throttle valve for controlling flow through the auxiliary intake passage, passage means for delivering exhaust gas from said exhaust passage to the auxiliary intake passage, passage means for delivering air to the auxiliary intake passage, valve means upstream from said throttle valve for varying the proportion of the exhaust gas and air delivered to the auxiliary intake passage, actuating means for the latter said valve means, and means including a lost-motion connection whereby said actuating means is responsive to movement of said throttle valve.

* * * * *